United States Patent [15] 3,698,687
Kitamura [45] Oct. 17, 1972

[54] ROTATORY VALVE HAVING ONE-PIECE SEAT CONSTRUCTION

[72] Inventor: Masaru Kitamura, Tokyo, Japan
[73] Assignee: KTM Industries, Inc., Houston, Tex.
[22] Filed: July 17, 1970
[21] Appl. No.: 55,737

[52] U.S. Cl. ................... 251/315, 251/317, 251/172
[51] Int. Cl. ............................................. F16k 5/06
[58] Field of Search ...................... 251/315, 316, 317

[56] References Cited

UNITED STATES PATENTS

| | | |
|---|---|---|
| 3,520,512 | 7/1970 | Huber .................. 251/315 X |
| 2,945,666 | 7/1960 | Freeman ............... 251/315 X |
| 3,210,042 | 10/1965 | Freeman ............... 251/315 X |
| 3,371,907 | 3/1968 | Scaramucci ........... 251/315 X |

Primary Examiner—Harold W. Weakley
Attorney—Ralph R. Browning

[57] ABSTRACT

A ball valve comprising a valve casing having a flowway therethrough, a spheroidal or spherical valve element having a passageway therethrough, said valve element being rotatably mounted within said valve body whereby said passageway can be moved into and out of register with said flowway, and a pair of valve seat members disposed within said valve casing forming a space between them for said valve element, said seat members being annular and each having in cross-section a body portion and an inwardly extending flange portion, said flange portion being deformable and having opposing faces, at least a portion of which are parallel and inclined to a plane radial to the axis of said flowway so as to provide substantially tangential engagement between one of said faces of each of seat members and said valve element.

9 Claims, 3 Drawing Figures

PATENTED OCT 17 1972 3,698,687

DIRECTION BY OF PRESSURE

Masaru Kitamura
INVENTOR

Ralph R. Browning
ATTORNEY 3,698,687

ROTATORY VALVE HAVING ONE-PIECE SEAT CONSTRUCTION

BACKGROUND OF THE INVENTION

The present invention relates to valves and more particularly to sealing elements for forming the valve seat.

Ball valves are being increasingly adopted by the petroleum and petrochemical industry for use in plants, pipelines, etc. The term "valves" used herein is intended to include valves employing both true spheres and spheroids and the like as valve elements, and the term "spheroid" is used as generic to all such valve elements. In the environments mentioned above, it is absolutely necessary that a valve be able to withstand severe service conditions and be relatively maintenance free. Furthermore, the utilization of ball valves which are operated automatically by pneumatic or electric actuators is becoming widespread in these industries as attempts are made to reduce operating costs and increase efficiency. In order that a ball valve be acceptable for automatic operation, it is desirable that it have a comparatively small, stable and uniform torque requirement for a given valve size under given pressure for opening and closing the ball member. The same characteristics are desirable for non-automatic operation also. Aside from the minimum torque requirement, it is of the upmost importance that the valve be designed so that leakage past the ball member be avoided at both low and high pressures. As will be readily recognized, the tighter and the more uniform the contact between the seating members or seals and the ball member, the higher the pressure that can be held without leakage through the valve. At the same time, such tight and uniform contact between the seating members and the ball member results in increased friction between those elements and of necessity an increased torque requirement for opening and closing the valve.

Numerous ball valves can be found in the prior art. Typical of such valves are disclosed in French patent 1,018,974 and U.S. Pat. No. 2,945,666. While most of the valves of the prior art are effective in terms of holding pressure without leakage, they generally have relatively high torque requirements making them somewhat less desirable.

SUMMARY OF THE INVENTION

It is therefore an object of the present invention to provide an improved valve.

Yet another object of the present invention is to provide an improved ball valve.

Another object of the present invention is to provide an improved ball valve which is substantially leakproof at high and low pressures.

An important object of the present invention is to provide an improved ball valve having minimum torque requirements for opening and closing of the valve.

Still another object of the present invention is to provide an improved ball valve having a seat constructed from a polyfluorohydrocarbon in which the valve seat is prevented from undergoing permanent distortion.

These and other objects of the present invention will become apparent from the drawings, the description given herein and the appended claims.

In general, the improved valve disclosed herein includes a suitable valve casing or body having a flowway therethrough, a spheroidal valve element or valve plug having passageway therethrough which valve element is rotatably mounted within the casing for movement between registering and nonregistering positions of the flowway and the passageway and a pair of annular seat members or seal rings mounted within the body in generally encircling relation to the flowway, the seat members forming a space between them for the spheroidal valve member. Each of the seat members has a body portion and deformable flange portion which projects radially inward toward the flowway. The flange portion, which is of lesser thickness than the body portion when viewed in transverse cross-section, has opposing faces, part of which are substantially parallel to one another and one of which contacts the spheroidal valve element to effect sealing against leakage when the valve is in the closed position.

DESCRIPTION OF THE PREFERRED EMBODIMENT

Figure 1:
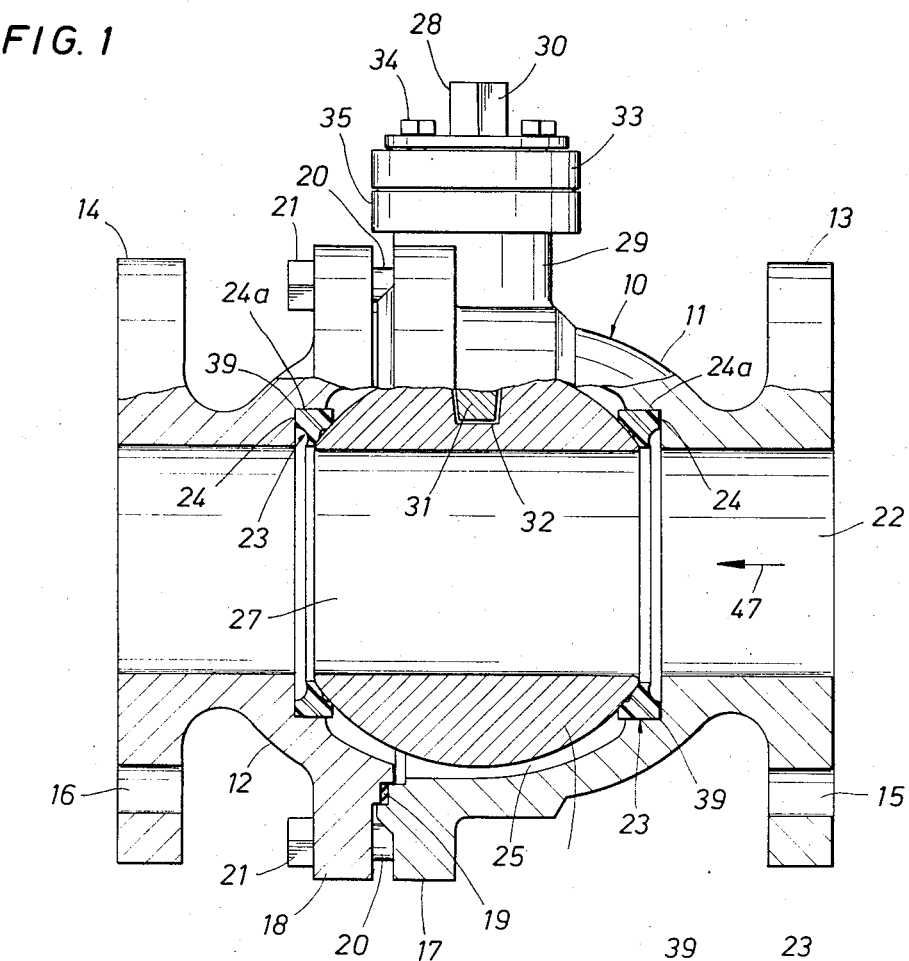
FIG. 1 is a side elevation, partly in section, of the improved ball valve of the present invention.

Reference is now made to the accompanying drawings for a detailed description of a preferred embodiment of the present invention, which is set forth by way of illustration and example only and not by way of limitation. Referring then to Fig. 1, the improved valve is shown to have a casing or body, shown generally at 10, comprised of casing sections 11 and 12, equipped with first flanges 13 and 14 respectively, which allow the valve to be connected into pipelines by means of a plurality of bolts (not shown) which extend through holes 15 and 16 in flange members 13 and 14 and registering holes in mating flanges on the ends of a pipe or other device to or from which flow is to be controlled. Any other type connection between the valve and adjacent pipes or fittings may be used. Casing sections 11 and 12 have second flanges 17 and 18, respectively, which mate together to form unitary valve casing 10. A gasket 19, disposed between flanges 17 and 18, is used to effect a seal between sections 11 and 12. A plurality of stud bolts 20, which screw into tapped holes in flange 17, extend through registering holes in flange 18. Nuts 21 screw onto the free ends of stud bolts 20 extending through flange 18 to thereby compress sections 11 and 12 together.

When secured together, casing sections 11 and 12 serve to form a flowway or bore 22 which while generally cylindrical in cross-sectional shape, can have virtually any shape. Removably mounted within body 10 are a pair of seat members 23 which are disposed in encircling relationship to flowway 22 and rest on shoulders 24 and 24a of casing sections 11 and 12. Seat members 23 form between them a space 25 into which fits free floating spheroidal valve element 26. Spheroidal valve element 26 which in reality appears as a truncated sphere because of openings to cylindrical passageway 27 extending therethrough, is thus able to rotate freely within valve seating space 25.

To enable spheroidal valve element 26 to be rotated between open and closed positions, i.e., with passageway 27 in and out of register with flowway 22 respectively, there is provided valve stem 28 which extends through neck 29 of valve casing 10 and is rotatably mounted in neck 29. Valve stem 28 is provided with wrench flats 30 or other such torque-transferring means to allow for rotation of valve stem 28. A handle (not shown) or automated actuator (also not shown) can be connected to valve stem 28 to effect rotation thereof. The extreme lower end of valve stem 28 is provided with a key 31 which is generally rectangular in cross-section which engages a similar shaped slot 32 in spheroidal valve element 26 to thus interengage valve stem 28 with spheroidal valve member 26 and prevent relative rotation between the two so that rotation of the valve stem results in rotation of spheroidal valve element 26. To ensure free floating of spheroidal valve element 26 within valve seating cavity 28, slot 32 is made larger than key 31 in all directions so that a certain amount of play exists. Thus, while spheroidal valve element 26 can float freely in valve seating space 25 and thus adjust itself as necessary to pressure variations in the line, it may still be rotated by valve stem 28.

Although not shown, valve stem 28 is supported within neck 29 by a conventional gland packing system to effect a bearing surface and seal for valve stem 28 within neck 29. A gland cover 33 is bolted to a flanged portion 35 of neck 29 by means of a plurality of bolts 34 which screw into tapped holes (not shown) in flanged portion 35.

Figure 2:
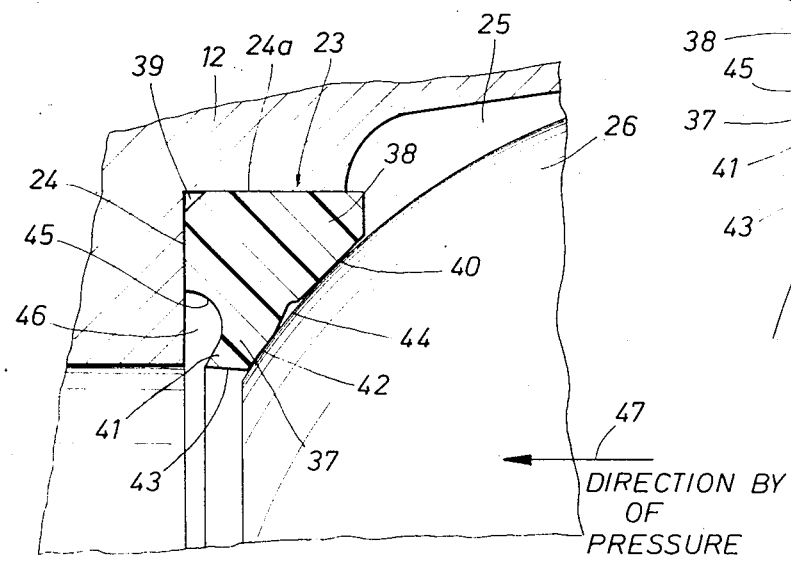
FIG. 2 is an enlarged detailed fragmentary, sectional view of one of the seat members with the ball member in place in the valve casing.
Figure 3:
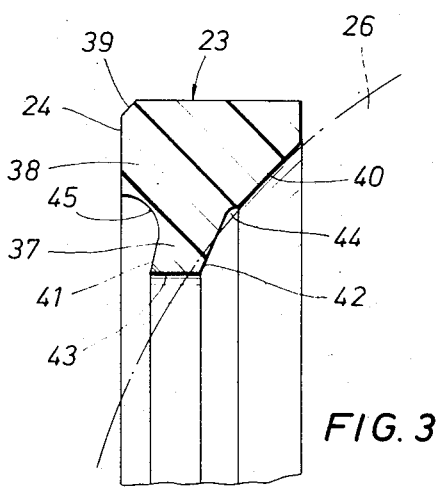
FIG. 3 is an enlarged detailed view similar to Fig. 2 showing the unstressed shape of the seat member before the ball member is put in place in the valve casing.

The configuration and arrangement of valve seat members 23 are best shown by reference to FIGS. 2 and 3. Referring first to FIG. 3, seat member 23 is shown in its relaxed state, i.e., before the valve element 26 is disposed within valve body 10, valve element 26 being shown in phantom lines. As seen in FIG. 3, seat members 23 are annular and have a radially inwardly extending flange portion 37 extending from a larger body portion 38. Body portion 38 seats in an annularly extending recess 39 formed by adjoining shoulders 24 and 24a located on the interior walls of casing 10. Body portion 38 has a substantially frustoconical oblique face 40 which under high pressures is engaged by the surface of spheroidal valve element 26 and limits the movement of spheroidal valve element 26 axially along flowway 22. As stated above, FIG. 3 depicts the condition of seat members 23 prior to assembly of the valve prior to the time flange portion 37 is partially deformed outwardly away from spheroidal valve element 26. Under low pressure operating conditions, there will be minimal contact between the surface of spheroidal valve member 26 and oblique face 40 of body portion 38. It is only under pressure conditions when spheroidal valve member 26 is urged axially along flowway 22 that substantial contact between oblique face 40 and the surface of spheroidal valve member 26 occurs.

Flange portion 37 has opposing faces 41 and 42 at least a portion of which are flat and substantially parallel to one another. The parallel portions of faces 41 and 42 which are joined at their innermost ends by flat face 43 are disposed at an angle to the longitudinal axis passing through flowway 22 and passageway 27 thus giving the inwardly most extending portion of flange 37 a configuration approximating a parallelogram when said flange portion is viewed in transverse cross-section. Face 42, which also is substantially frustoconical, is in cross-section flat, is disposed at an obtuse angle to face 40 of body portion 38. Body face 40 and flange face 42 are joined by a step 44 which lies at the approximate junction of flange 37 and body 38 and which gives seat member 23 the appearance of having an annular notch facing spheroidal valve member 26, and provides a flexure line along which the major flexure between the flange 37 and body 38 will take place.

While face 42 is substantially flat along its entire length, face 41 of flange 37 is flat for only a portion of its length. Flange portion 37 flares outwardly on the side having face 41 such that when viewed in transverse cross-section, seat member 23 has a concave recess located substantially at the point where flange portion 37 and body portion 38 are joined. It is to be understood that when speaking of flange portion 37 and body portion 38 being joined, this is by way of describing the shape and configuration of seat member 23 and is not intended as an indication that seat member 23 is in two separate parts. The surface 45 of the concave recess is contiguous with flat surface 41 such that a smooth, continuous, arcuate-shaped surface appears when seat member 23 is viewed in transverse cross-section. While the curve of surface 45 will generally be circular, it need not be. For example, the curve of surface 45 could be that of a portion of a parabola, an elipse or some other such smooth, rounded geometrical figure. Thus it is seen that an annular cavity 46 will be formed by curved surface 45, flat surface 41 and shoulder 24 formed internally of body 10.

The advantages and action of seat members 23 are best seen by reference to FIGS. 1 and 2. Spheroidal valve element 26 is sized such that when it is placed into the seating cavity 25 and casing sections 11 and 12 are secured together, flange portions 37 of seat members 23 are deformed outwardly by pressure from spheroidal valve element 26. For purposes of illustration, assume the pressure of fluid being handled is acting in the direction shown by arrow 47. When the valve is under low pressure, i.e., when the pressure on one side of the spheroidal valve element 26 is substantially the same or not much greater than the pressure on the opposite side of the spheroidal valve element 26, sealing against leakage is achieved by means of face 42 of the upstream seat member (See FIG. 1) which is biased against the surface of spheroidal valve element 26, i.e., the initial deformation placed upon flange portion 37 causes flange portion 37 to exert a pressure against the surface of spheroidal valve element 26. Assume now that the pressure increases, still in the direction shown by arrow 47. This increased pressure against the upstream side of spheroidal valve element 26 will cause it to move or "float" towards the downstream side. Such action will of course reduce the sealing tendencies of face 42 on the upstream side of spheroidal valve element 26. At the same time, it will increase the sealing tendencies of face 42 located on seat member 23 on the downstream side of spheroidal valve element 26. If the pressure is high enough and consequently the movement or floating of spheroidal valve element 26 is great enough, the upstream seal member will become virtually ineffective and the entire seal will be accomplished by the downstream seal member.

As will be observed, as the pressure increases as per the direction of arrow 47, flange portion 37 will tend to deform or bend even more from its initially distorted position as it reacts to axial movement of spheroidal valve element 26. The concave surface 45 in conjunction with step 44 coact to allow flange portion 37 to bend at step 44 rather than at the sealing face 42. This localized bending of flange portion 37 thus ensures that seat member 23 will seal at low as well as at high pressures.

If the upstream pressure on spheroidal valve member 26 becomes very great, flange 37 will be deformed to the extent that the surface of spheroidal valve element 26 will begin to tightly contact face 40 of body portion 38. Thus, under extremely high pressures, sealing will be accomplished at the intersection of spheroidal valve member 26 and face 40 of body portion 38. The design of seat member 23 prevents flange portion 37 from being distorted beyond its elastic limit. The prevention of permanent distortion in flange portion 37 is accomplished by the fact that the axial movement of spheroidal valve element 26 is limited by it contact with face 40 of body portion 38. Thus face 40 accomplishes a two-fold function of acting as a sealing surface under extremely high pressures and also as a limiting surface to restrain axial movement of spheroidal valve element 26 and thereby prevent permanent distortion or set in flange portion 37. It should be noted that at all times a very small area of seat member 23 is actually in contact with spheroidal valve member 26. Thus the sealing action will be similar to that of an O-ring having minimum surface contact and consequently the torque required to open and close the valve will be comparatively low. Indeed, comparative measurements of torque requirements on a valve designed in accordance with the present invention and those of prior art design have shown that torque requirements on the former are up to 50% less than those on the latter.

As was noted in reference to FIG. 3, an annular cavity 46 is formed between seat member 23 and shoulder 24 of valve casing 10. The presence of valve cavity 46 also aids in the prevention of permanent distortion of flange portion 37. For example, when the valve is in the closed position and is under high pressure, the cavity 46 which is located on the high pressure side of spheroidal valve element 26 will, since it is in open communication with passageway 22, fill with the fluid in the line. The pressure exerted by the fluid in cavity 46 will act normal to the parallel portion of face 41 and tend to urge face 41 and thus flange portion 37 towards spheroidal valve element 26. Thus, although by previously being connected such that the particular flange portion 37 was deformed away from spheroidal valve element 26, the above-described action will tend to return flange 37 to its original position. It is this unique parallel face design of flange portion 37 which allows the above-described action to occur. The design of seat member 23 proposed herein by which permanent deformation or set of flange portion 37 is prevented is quite critical when it is considered that some of the most desirable valve seat materials are materials which are susceptible to cold flow and permanent set. One of the most commonly employed and useful materials for making valve seats and seals are the various fluorinated hydrocarbons or fluorinated-chlorinated hydrocarbons such as Teflon marketed by duPont Chemical Company. These materials make excellent valve seats because they have a low coefficient of friction, are durable and resistant to most chemicals. At the same time, these fluorinated hydrocarbons have a tendency, when deformed for long periods of time, to undergo permanent set or distortion, i.e., they are generally inelastic. However, the unique design of the valve seat member herein prevents this permanent distortion of the sealing flange and thus allows the seat members to be constructed from Teflon or for that matter even certain metals. It is to be understood that the construction of the seat members is not limited to the fluorohydrocarbons or metals but that virtually any material commonly used as a valve seat or seal can be employed.

It is to be understood that while reference above has been made to upstream and downstream side of spheroidal valve member 26, either side may function as the upstream or downstream side depending on the direction of flow of the fluid through the valve. Likewise, any description made in reference to a single seat member is applicable to the opposing seat member, the seat members being of identical design in all respects.

I claim:

1. A valve comprising
a casing having a flowway therethrough,
a spheroidal valve element having a passageway therethrough, said valve element being rotatably mounted within said casing for rotation between registering and non-registering positions of said flowway and said passageway, and
a pair of annular seat members mounted within said casing in generally encircling relation to said flowway and in separated relation to each other within said casing to thereby form between them a space for said spheroidal valve element, each of said seat members being of one piece construction and comprising a body portion and an elastically deformable flange portion adjoined at an annularly extending notch facing said valve element, said flange portion projecting from said body portion inward towards said flowway, said flange portion being of lesser thickness than said body portion when viewed in transverse cross-section and having opposing faces at least a portion of which are substantially parallel to one another and inclined to a plane radial to the axis of the flowway, the greater part of said parallel portion of said flange faces facing said valve element being in engagement with said valve element.

2. The valve of claim 1 wherein said faces of said flange portions engaging said spheroidal valve element and the faces of said body members adjacent said spheroidal valve element are substantially frustoconical 3. The valve of claim 1 wherein said seat members have substantially concave recesses annularly disposed so as to lie substantially at the point where said flange portions and said body portions are joined, the surfaces of said concave recesses and the faces of said flange portions opposite said faces in engagement with said spheroidal valve element being contiguous with one another to thereby form smooth continuous surfaces.

4. The valve of claim 1 wherein said seat members are disposed within said body with respect to said spheroidal valve element as to produce initial distortion of said flange portions outwardly from said spheroidal valve element and thereby cause said faces of said flange portions engaging said spheroidal valve element to exert sealing pressure against said spheroidal valve element.

5. The valve of claim 3 wherein said concave recesses have a substantially circular radius of curvature.

6. The valve of claim 1 wherein said passageway and said flowway are substantially cylindrical.

7. The valve of claim 1 wherein said seat members are disposed within said casing with respect to said valve element and the faces of said body portions facing said valve element are separated by a distance such that sufficient pressure acting against said valve element will urge said valve element into sealing contact with the face of one of said body portions facing said valve element.

8. The valve of claim 7 wherein said faces of said body members facing said valve element are substantially frustoconical.

9. The valve of claim 8 wherein said faces of said flange portions engaging said valve element are substantially frustoconical.

* * * * *